United States Patent [19]

Müller

[11] Patent Number: 4,531,079
[45] Date of Patent: Jul. 23, 1985

[54] BRUSHLESS DC DRIVE MOTOR FOR SIGNAL RECORDING MEANS

[75] Inventor: Rolf Müller, St. Georgen, Fed. Rep. of Germany

[73] Assignee: Papst-Motoren GmbH & Co. KG, St. Georgen, Fed. Rep. of Germany

[21] Appl. No.: 498,451

[22] Filed: May 26, 1983

[30] Foreign Application Priority Data

May 27, 1982 [CH] Switzerland .......................... 3263/82

[51] Int. Cl.³ ............................................ H02K 29/02
[52] U.S. Cl. .................................... 318/254; 318/138; 310/68 R
[58] Field of Search ................... 318/254 A, 254, 138, 318/439; 310/68 R, 113, 198

[56] References Cited

U.S. PATENT DOCUMENTS

| 3,840,761 | 10/1974 | Muller | 310/268 X |
| 3,873,897 | 3/1975 | Muller | 310/172 X |
| 3,883,633 | 5/1975 | Kohler | 318/254 X |
| 4,125,792 | 11/1978 | Schmider | 310/268 |
| 4,125,796 | 11/1978 | Nagase et al. | 318/254 X |
| 4,174,484 | 11/1979 | Schmider | 310/268 X |
| 4,211,963 | 7/1980 | Muller | 310/268 X |
| 4,366,405 | 12/1982 | Schmider | 310/68 R |
| 4,371,817 | 2/1983 | Muller | 310/46 X |

FOREIGN PATENT DOCUMENTS

| 2850031 | 5/1979 | Fed. Rep. of Germany | 310/68 R |
| 2826608 | 1/1980 | Fed. Rep. of Germany | 318/254 |
| 0112410 | 9/1978 | Japan | 318/254 |
| 0147210 | 12/1978 | Japan | 318/254 |
| 0020315 | 2/1979 | Japan | 318/254 |
| 0030411 | 3/1979 | Japan | 318/254 |
| 0097722 | 8/1979 | Japan | 318/254 |
| 0100057 | 7/1980 | Japan | 318/254 |
| 0088555 | 7/1980 | Japan | 318/254 |
| 56-53564 | 5/1981 | Japan | 310/68 R |
| 56-83256 | 7/1981 | Japan | 310/198 |

Primary Examiner—William M. Shoop
Assistant Examiner—Bentsu Ro
Attorney, Agent, or Firm—Fitch, Even, Tabin & Flannery

[57] ABSTRACT

A brushless DC motor is provided having at least four stator poles and a rotor. The rotor has a permanent magnet system that includes at least two pair of poles and a device for the detection of the rotor position. A commutation circuit is mounted on the stator and is controlled by the rotor position detection device. To generate an exact position signal of the rotor, a first detection pulse per mechanical revolution and a second detection pulse, displaced with respect to the first by 180 mechanical degrees and differentiatable from the first, are provided.

15 Claims, 13 Drawing Figures

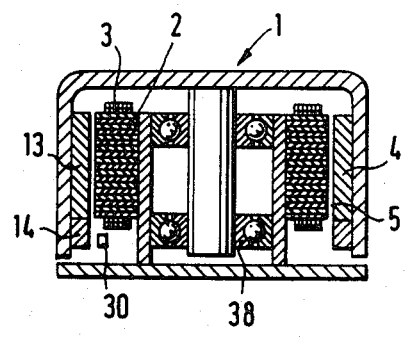
FIG. 1
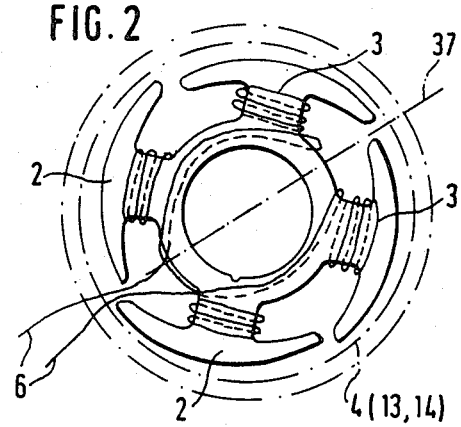
FIG. 2
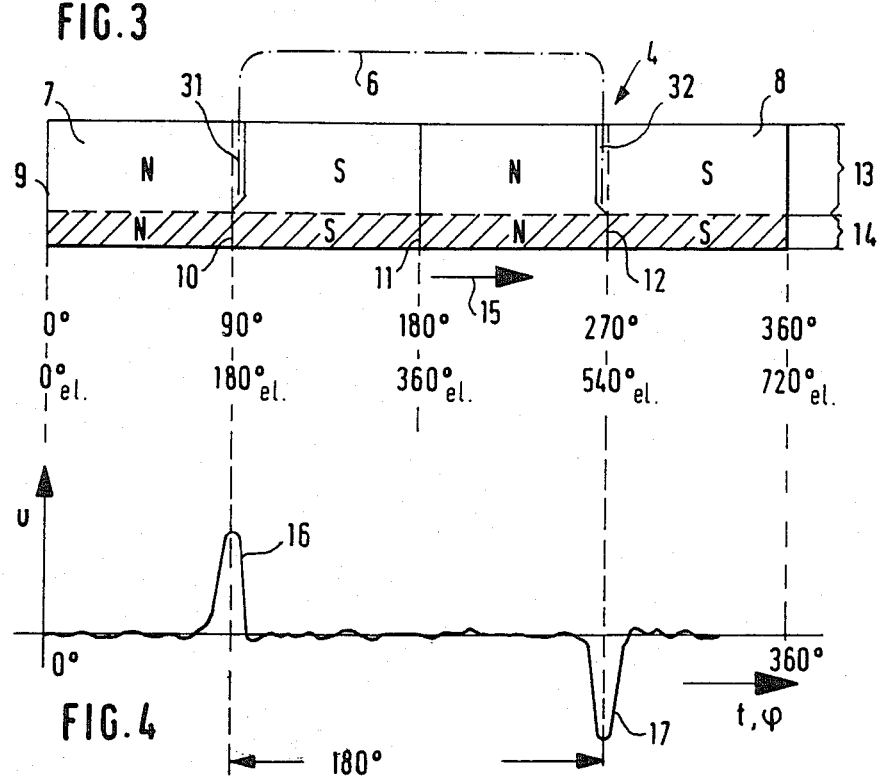
FIG. 3
FIG. 4

BRUSHLESS DC DRIVE MOTOR FOR SIGNAL RECORDING MEANS

BACKGROUND OF THE INVENTION

1. Field of the Invention

This application relates to a Brushless D.C. Motor for the drive of signal recording means or the like where similar problems are to be solved. It preferably deals with a motor of at least four stator poles and a permanent-magnet-rotor with at least two pole-pairs. Particularly this invention concerns such motors which are used for the direct drive of winchester or floppy disks or capstans or head drums of video recorders. More particularly, this invention concerns those drive motors which operate off D.C. sources and have external rotors which can support one or more discs in a disc drive.

2. Description of the Prior Art

The motor according to the invention is related with other U.S. patent applications, already filed, which are listed below and which are incorprated herewith by reference in their entirety:

| U.S. Serial Number | matured into U.S. Pat. No. |
| --- | --- |
| 363,290 | 3,873,897 |
| 363,291 | 3,840,761 |
| 576,650 | 4,125,792 |
| 708,092 | 4,174,484 |
| 919,702 | 4,211,963 |
| 250,224 | 4,322,666 |
| 212,502 | 4,371,817 |
| 220,181 | 4,429,263 |
| 210,768 (commonly owned) | |
| 284,385 | 4,430,603 |

SUMMARY OF THE INVENTION

The invention concerns a brushless DC motor with at least four stator poles and with a rotor, which has a permanent magnet system providing at least two pair of poles and a device for the detection of the rotor position, as well as a commutation device that is mounted on the stator and is controlled by the detection device.

Such motors are known, for example, from U.S. Pat. No. 4,429,263, issued Jan. 31, 1984 and from U.S. Pat. No. 4,430,603, issued Feb. 7, 1984. In a signal recording device according to the last mentioned patent, a pulse is generated by means of a special magnetization structure of the rotor. In these known motors, the detection pulses for the rotor position, because of temperature sensitivity or aging-dependence of the galvanomagnetic rotor position sensors (for example, Hall IC's) do not always occur exactly at the same rotor position, but rather may vary in accordance with temperature.

Such detection pulses are necessary in brushless DC motors for the commutation of the currents from coil to coil of the stator winding. They are also used for speed regulation. However, signal recording devices require a special, exact position signal of the rotor, and various demands are placed upon this signal.

Video tape devices have, for example, two scanning heads on the periphery of the head drum over which the tape runs. Each of the two heads scans a half-image, and for the finding of specific positions, it is necessary to have available two differentiable pulses, peripherally displaced by 180 degrees. Known structures provide on the rotor periphery (mechanically displaced 180 degrees) two cobalt-samarium magnets. On each opposite position of the stator is one coil. This structure is very expensive.

The invention is based upon the problem of generating a first detection pulse 16 (FIG. 5), to the extent possible independent of temperature fluctuations and aging effects, per mechanical revolution, and a second detection pulse 17, displaced with respect to the first by 180 mechanical degrees, which second pulse is differentiable from the first.

These pulses 16, 17 which are to be attained by means of the invention have different polarities, and thus can be easily differentiated. Indeed, temperature changes can slightly alter the height of these voltage pulses because of the remanence of the rotor magnets. However, they cannot change their position with respect to the rotor position.

According to the invention, it is only necessary to peripherally slightly displace two pole limits 9, 10, 11 or 12 (FIG. 3) with respect to one another and to arrange an auxiliary winding 6 (FIGS. 2 and 9) (if necessary, a simple armature turn) over at least two adjacent stator poles. Thereby, the one pole limit of the rotor magnet (exciter magnet) is slightly displaced at an interval of 360 degrees el. (or even-numbered multiples) on the periphery of the air gap in the direction of motion of the rotor to thereby constitute periphery region 31, and the other pole limit is slightly displaced against the direction of motion to thereby constitute periphery region 32. In particular in the case of an even number of the pairs of poles of the rotor, that is, 2, 4, 6, 8, etc., the auxiliary winding according to the invention can be advantageously provided as a so-called full-pitch winding. For example, the pitch of two stator/rotor poles is equal to the pitch of the auxiliary winding, or the pitch of the auxiliary winding is equal to the pitch of four, six, eight, ten of the stator/rotor pole pitches.

The rotor magnet, in a further aspect of the invention, is divided into two magnetization regions 13, 14 (FIG. 3), whereby one region 13 with displaced poles serves for the production of the detection pulse for the rotor position in addition to the rotative motion effect and a second region 14, with peripherally equidistant poles, serves for the commutation. The region 14 for the commutation could also be provided with light/dark marking for an optoelectronically controlled commutation.

When microprocessors are employed for the commutation of the motor, the inventive displacement of the pole limits can extend over the entire width of the rotor magnet (understood as transverse to the direction of rotation).

BRIEF DESCRIPTION OF THE DRAWING

In the following, the invention will be explained with embodiment examples depicted in the drawings, in which:

FIG. 1 shows schematically a section through a preferred embodiment of the invention as a motor of the external rotor type, in particular in connection with FIG. 2 and FIG. 9;

FIG. 2 shows in a top view in enlarged scale of a first embodiment of a stator for a cylindrical air gap according to FIG. 1 (two-pulse operation);

FIG. 3 is a development of one of the rotor magnets of the invention, which is to be understood as a straight, flat development for an air gap according to FIG. 2 or 9 and for an air gap according to FIGS. 10 or 11;

FIG. 4 is a simplified diagram of the voltage pulse generated by the auxiliary winding of the invention;

DESCRIPTION OF THE PREFERRED EMBODIMENTS

Figure 9:
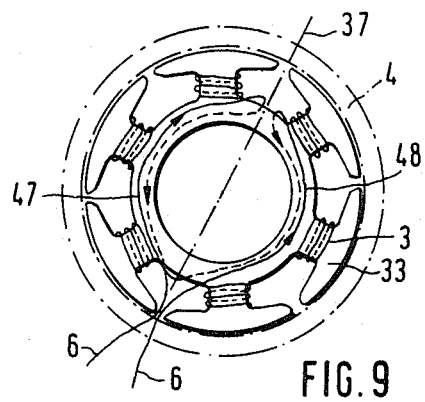
FIG. 9 is a top view of a second stator for a cylindrical air gap similar to that depicted in FIG. 2, but having six windings.
Figure 10:
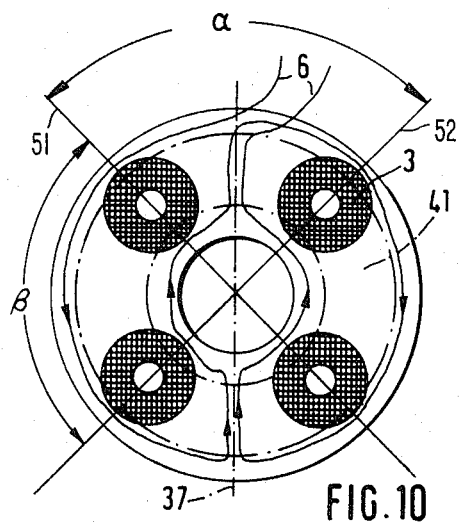
FIG. 10 is a top view of a third stator for a planar air gap with four windings arranged in one plane.
Figure 11:
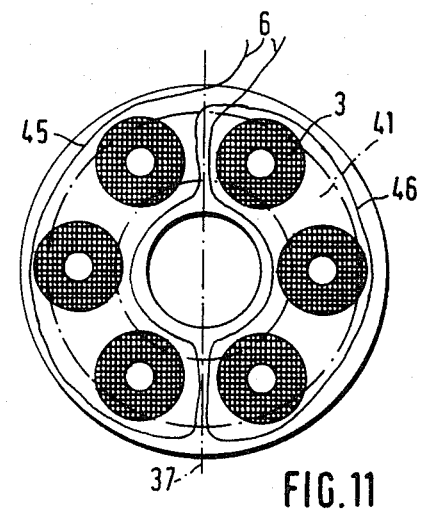
FIG. 11 is a top view of a fourth stator for a planar air gap with six windings arranged in one plane.

The FIGS. 10, 11, because of their top view onto the air gap, show the turns of the auxiliary winding of the invention with the reversed winding direction of its partial windings 45, 46, which are connected in series. Also, the partial windings 47, 48 of the FIGS. 2, 9 are connected in the same manner.

FIG. 1 shows, schematically in section, a brushless DC motor 1, depicted in the embodiment example as a motor of the external rotor type. It includes a stator lamination stack 2, which carries a stator winding 3. The stator lamination stack 2, together with an annular permanent magnet 4 of the rotor, forms an essentially cylindrical air gap 5.

In FIG. 2, a two-pole auxiliary winding 6 is shown, the turns of which are wound around a pair of stator poles of the stator lamination stack 2 in such a manner that they project into opposite magnetic pole fields 7, 8 of the permanent magnet (rotor magnet) 4 (FIG. 3). As may be seen in FIG. 3, the magnet 4 contains four pole ends or limits 9, 10, 11, 12 and is divided into two regions 13, 14. In the region 13, the pole limits 10, 12 and are slightly displaced with respect to one another and they thereby form periphery regions 31, 32. Specifically, the pole limit 10 is displaced in the direction of an arrow 15 (direction of motion of the rotor) and the pole limit 12 is displaced opposite the direction of the arrow 15. The periphery regions formed by the displacement of the poles of the rotor magnet are not larger than 20% of the pole width, and preferably amount to 5 to 10% of the same. In the region 14, on the other hand, the pole limits 9, 10, 11, 12 are arranged precisely symmetrically in 90 degree divisions. The auxiliary winding 6 is essentially wound over a diameter of the stator (full-pitch winding) and is divided into two parts, each with preferably the same number of turns, whereby these parts are arranged in mirror images to each other with respect to an axis of symmetry 37 of the stator on both sides of a bearing system 38.

Figure 5:
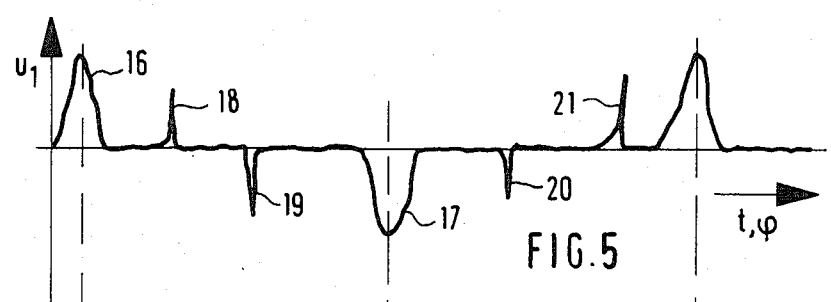
FIG. 5 is a diagram of the voltage pulses generated by the auxiliary winding over a rotation of 360 mechanical degrees.
Figure 6:
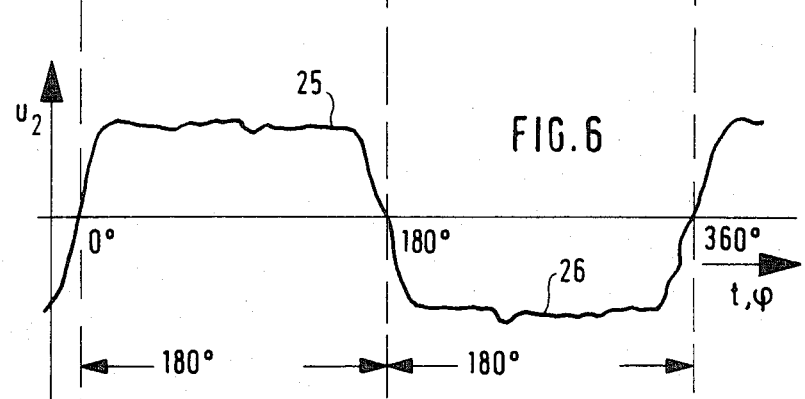
FIG. 6 is a diagram of the voltage pulses of FIG. 5, which are transformed in a first switching stage.
Figure 7:
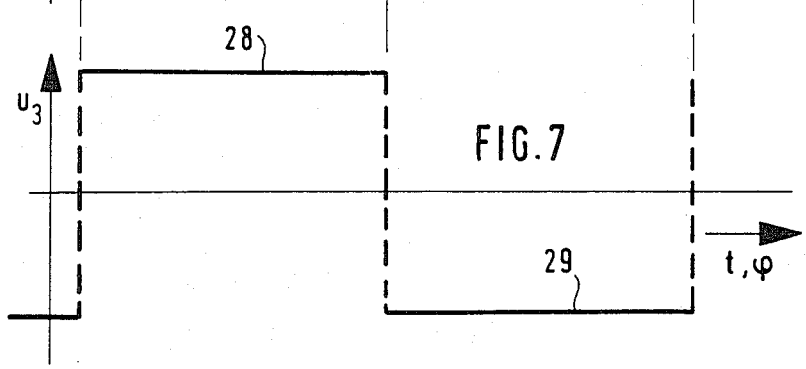
FIG. 7 is a diagram of the voltage pulses of FIG. 6, which are transformed into a rectangular shape in a second switching stage.

The voltage pulses 16, 17 are generated in the auxiliary winding 6 by rotation of the periphery regions 31, 32 and are shown schematically in the diagram in FIG. 4 over a range of 180 mechanical degrees. The two voltage pulses 16, 17, induced per revolution of the rotor magnet 4 with regions 31, 32, have different polarities and are thus easy to differentiate. In the FIGS. 5 through 7, it is shown how the voltage pulses 16, 17, which are induced by the auxiliary winding 6, and the interference pulses 18, 19, 20, 21 are transformed in stages, in order to obtain specific switching points. A block diagram (FIG. 8) shows an example of a circuit for the previously mentioned pulse transforming. Via a first switching stage, consisting of a resistor 22, a capacitor 23 and an integrator 24, the voltage and interference pulses $U_1$ are transformed into $U_2$ pulses 25, 26 (FIG. 6) and are finally transformed via a comparator 27 into $U_3$ pulses 28, 29 (FIG. 7).

The operation of the invention is described in the following. The four-pole rotor magnet 4 contains, as usual, four pole limits 9, 10, 11, 12, of which two 9, 11 lie opposite one another unchanged in 180 degree positions (mechanical). The other two are displaced at least partially with respect to the 90 degree positions (mechanically), and specifically, one pole limit 10 is somewhat displaced in the direction of the arrow 15, the other somewhat against the direction of the arrow 15.

The effect of the four-pole main magnetization according to FIG. 2 on the 4-pole stator winding 3 (with an effective coil width of each pole at the air gap of approximately a simple rotor pole width of 180 degrees el.) is not appreciably disturbed by the slight pole limit displacement 31, 32, since the displacements with respect to the 4-pole winding 3 in their effect almost cancel each other. That is, they act only like a slight broadening of the interpolar gap of the rotor magnet 4 (compare U.S. Pat. No. 3,873,897).

Figure 8:
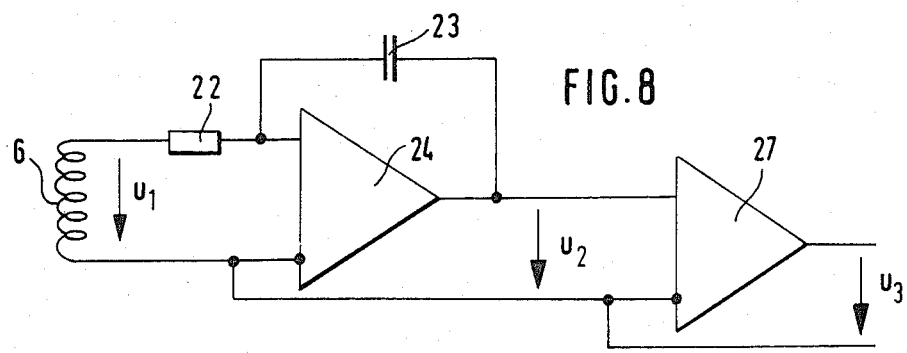
FIG. 8 is a schematic diagram of the pulse transforming means of the pulses of FIGS. 5 to 7.

Since the auxiliary winding (preferably of 360 degrees el. coil width) and the stator winding are not electromagnetically coupled as a transformer, the stator fields of the main winding do not significantly interfere with the auxiliary winding. Short, needle-like interference pulses 18, 19, 20, 21 can also, in a further development of the inventive concept, be suppressed by integration of the voltage pulses. The integration offers also a convenient means of evaluation by the comparator 27 (FIG. 8).

To obtain a uniform commutation, it is advantageous to control the galvanomagnetic rotor position sensor (Hall IC) 30, which is designed preferably as a magnetic field-sensitive sensor, from the region 14 of the rotor magnet 4, which has no displacement of the pole limits 9, 10, 11, 12.

It is possible by means of the inventive arrangement to obtain automatically only one pulse per revolution, specifically with the help of a diode.

In FIG. 9, a further stator arrangement, for operation with 3 or 6 pulses, which has six windings 3 and a stator lamination stack 33, is depicted, whereby, on the periphery, an essentially constant air gap is formed. The rotor has 4 poles. The arrangement is described in detail in copending application U.S. Ser. No. 210,768, filed November, 1980.

Figure 12:
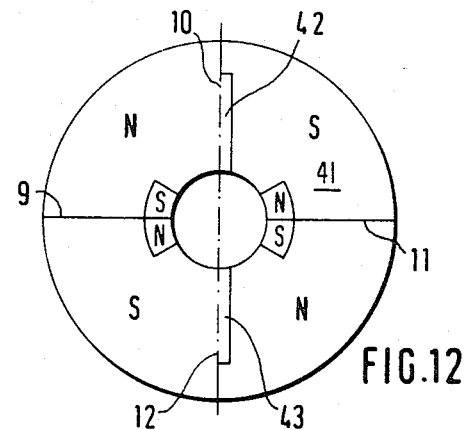
FIG. 12 is a further embodiment with a disk-shaped rotor magnet having a special magnetization pattern.

FIG. 10 shows a coil arrangment with 4 equidistant coils 3 ($\alpha = 90$ degrees) of a stator for a rotor according to FIG. 12, which arrangement is described in detail in U.S. Pat. Nos. 4,211,963, 4,322,666 and 4,371,817.

FIG. 10 also shows a one-layer, very simple stator winding with 4 individual coils 3, which is suitable for a disk-shaped rotor with 8 permanet magnet poles. The coils 3, which lie diametrically opposite one another, have central straight reference lines 51, 52, which, in this illustrated embodiment, lie at an angle of $\alpha = 67.5$ degrees, mechanical, to one another. This is described in detail in U.S. Pat. No. 4,125,792. The motor is driven with 4 pulses.

A further design of such a simple one-layer winding with four coils for low leakage flux, which is favorable for signal recording devices, is disclosed in U.S. Pat. No. 4,174,484, which describes and shows in FIG. 7 thereof four consecutive coils at a spacing of 270 degrees el.. Here, too, the invention can be advantageously employed. Thus, the arrangement of FIG. 10 hereof corresponds also to the subject matter of that patent. The axis of symmetry 37 would then run between the second coil 58 and the third coil 120 of FIG. 7 of U.S. Pat. No. 4,174,484, the motor of which is driven by 4-pulse operation.

FIG. 11 shows an arrangement comparable to that of FIG. 9, except that the FIG. 11 device is for a planar or axial air gap. The stator pole width amounts to 120 degrees el. (approximately). The rotor has eight poles and, because of this, the stator poles 3 have a geometrically relative small width. Alternatively, the rotor may have 4 poles with a doubled "mechanical" coil width. However, such a winding is more expensive in the manufacture because trapezoid-like coils are necessary.

An embodiment example of a rotor magnet 41 of a motor of the disk rotor type is represented in FIG. 12 in a top view. Because this has a planar air gap 5 (FIG. 13), the pole limit 10 is on a circular rotor magnet 41 and is slightly displaced in the clockwise direction, while the pole limit 12 is slightly displaced in the counterclockwise direction. Thereby, regions 42, 43 arise, that are oppositely poled and which, as was described earlier in connection with FIG. 3, serve together with an auxiliary winding 6 (FIG. 11), for the generation of two pulses per revolution.

Figure 13:
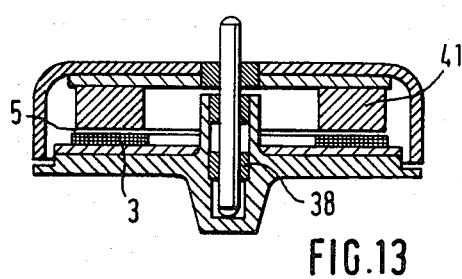
FIG. 13 is a section through a motor of the disk rotor type according to FIGS. 10, 11 or 12.

In FIG. 13, in simplified form, a motor of the disk rotor type is shown, which could contain the stator arrangements depicted in the FIGS. 10 and 11 and the rotor magnet 41 of FIG. 12.

Instead of an auxiliary winding being mechanically wound over the diameter, as shown in FIGS. 2, 9, 10 and 11, in combination with the periphery regions 31, 32 or 42, 43, four such periphery regions displaced over 90 degrees with respect to one another could be provided. The auxiliary winding would, in such case, be wound with one partial winding wrap around two diametrically opposite quadrants in combination with a four-pole rotor as in FIG. 12, except having four periphery regions (42, 43) at 90 degree intervals instead of the depicted two regions. U.S. Pat. No. 3,840,761 shows a motor arrangement which would make an auxiliary winding with four periphery regions of this kind advantageously usable.

One can provide the commutation by means of microprocessors in that voltage induced in the stator winding by means of the rotor magnet is used as a signal for the position of the rotor. The microprocessor in response to this controls the commutation of the coil currents, and the present stator coils can be used as position indicators for the commutation of the motor. Then the rotor position sensor can be dispensed with. Thereby, the region 14 of the rotor magnet is also eliminated, so that its magnetization is simplified and the volume of the magnet is reduced.

The invention can be used in a corresponding manner in motors of the internal rotor type.

Reference Numbers

1. DC motor
2. stator lamination stack
3. stator winding
4. rotor magnet
5. air gap
6. auxiliary winding
7. magnetic field
8. magnetic field
9. pole limit
10. pole limit
11. pole limit
12. pole limit
13. exciter magnet
14. control magnet
15. arrow (direction of motion of the rotor)
16. voltage pulse
17. voltage pulse
18. interference pulse
19. interference pulse
20. interference pulse
21. interference pulse
22. resistor
23. capacitor
24. integrator
25. pulse
26. pulse
27. comparator
28. pulse
29. pulse
30. rotor position sensor
31. periphery region
32. periphery region
33. stator lamination stack
37. axis of symmetry
38. bearing system
41. rotor magnet
42. region
43. region
45. partial winding
46. partial winding
47. partial winding
48. partial winding
51. reference line
52. reference line

I claim
1. Brushless DC motor comprising:
a stator having winding means forming at least four stator poles creating an electromagnetic field;
a permanent magnet rotor having at least two pair of poles journaled and located such that its magnetic field interacts with the electromagnetic field of the stator poles, the rotor poles being alternately magnetically polarized in an annular directions;
rotor position sensing means located to be actuated in predetermined rotor positions to provide rotor positions information;
commutating means for controlling the current in said stator winding means in response to said rotor position sensing means as a function of rotor position to produce an electromagnetic field in said stator;
means for providing a detection pulse for rotor position at at least one specific position of each rotation of said rotor, said means including an auxiliary winding wound over at least two adjacent stator poles having an extent of 360 degrees el. with respect to the rotor and further including at least two pole limits of said rotor being displaced circumferentially at the position of 360 degrees el. forming at least two circumferentially small periphery regions having a magnetization opposite to one another wherein, upon rotation of the rotor, the magnetic field of each periphery region induces a pulse in the auxiliary winding.

2. Brushless DC motor comprising:

a stator having winding means forming at least four stator poles creating an electromagnetic field;

a permanent magnet rotor having at least two pair of poles journaled and located such that its magnetic field interacts with the electromagnetic field of the stator poles, the rotor poles being alternately magnetically polarized in an annular direction;

rotor position sensing means located to be actuated in predetermined rotor positions to provide rotor position information;

commutating means for controlling the current in said stator winding means in response to said rotor position sensing means as a function of rotor position to produce an electromagnetic field in said stator;

means for providing a detection pulse for rotor position at at least one specific position of each rotation of said rotor, said means including an auxiliary winding of the stator, wound such that is responds to the magnetic field of the rotor without providing rotative force to the rotor and wherein its voltages induced by the magnetic fields of the rotor are substantially canceled, at least two pole limits of said rotor being displaced circumferentially at the position of 360 degrees el. forming at least two circumferentially small periphery regions having a magnetization opposite to one another wherein, upon rotation of the rotor, the magnetic field of each periphery region induces a pulse in the auxiliary winding.

3. Brushless DC motor according to one of claims 1 or 2, wherein the number of pair of poles of the rotor magnet is an even number.

4. Brushless DC motor according to one of the claims 1 or 2, wherein the auxiliary winding is essentially wound over the geometric diameter of the stator.

5. Brushless DC motor according to claim 4, wherein the auxiliary winding is divided in two parts with preferably the same number of turns on each part, and these parts are arranged in mirror images to each other with respect to an axis of symmetry of the stator.

6. Brushless DC motor according to one of the claims 1 or 2, wherein the rotor magnet is divided into first and second adjacent annular magnetic regions extending in the direction of rotation, said first region being located to magnetically interact with said stator and said auxiliary winding and having one pole limit displaced in the direction of rotor rotation and another pole limit displaced against the direction of rotor rotation.

7. Brushless DC motor according to claim 6, wherein said rotor position sensing means is located to be magnetically actuated by said second magnetic region of said rotor magnet and wherein the pole limits are arranged with equal circumferential spacings.

8. Brushless DC motor according to claim 7, wherein the motor is a two-pulse motor which has an alternating field and a reluctance auxiliary moment and wherein only one rotor position sensor is arranged to respond to said second region of the rotor magnet.

9. Brushless DC motor according to claim 1, wherein the stator has four poles each with a peripheral extension of 180 degrees el. and the auxiliary winding extends over 360 degrees el., and wherein two pole limits of the exciter magnet of the rotor are displaced peripherally at a spacing of 360 degrees el.

10. Brushless DC motor according to one of claims 1 or 2, wherein on a smooth-core stator iron core, the stator winding provides adjacent the air gap and along with the auxiliary winding a full coil width.

11. Brushless DC motor according to one of the claims 1 or 2, wherein the brushless DC motor is a three phase motor, with a stator pole to rotor pole ratio of 3:2 and wherein the auxiliary winding is wound over the stator poles and assumes a winding pitch of even multiples of 360 degrees el.

12. Brushless DC motor according to claim 11, wherein over a stator winding having at least six poles each with a peripheral extension of at least approximately 120 degrees el., an auxiliary winding is provided over at least three adjacent stator poles with a total peripheral extension of at least approximately 360 degrees el.

13. Brushless DC motor according to claim 11, wherein the induction distribution of the rotor magnet is at least approximately trapezoidal in the air gap, as viewed in the direction of rotation of the rotor.

14. Brushless DC motor according to one of claims 1 or 2, wherein the periphery regions formed by the displacement of the poles of the rotor magnet are not larger than 20% of a pole width, and preferably amount to 5 to 10% of the same.

15. Brushless DC motor according to one of claims 1 or 2, wherein the induction distribution of the rotor magnet is at least approximately trapezoidal in the air gap as viewed in the direction of rotation of the rotor.

* * * * *

UNITED STATES PATENT AND TRADEMARK OFFICE
CERTIFICATE OF CORRECTION

PATENT NO. : 4,531,079

DATED : July 23, 1985

INVENTOR(S) : Rolf Müller

It is certified that error appears in the above-identified patent and that said Letters Patent is hereby corrected as shown below:

Col. 2, Line 66, change "Figs." to --Fig.--.

Col. 5, Line 22, change "relative" to --relatively--.

Col. 6, Line 56, change "directions" to --direction--.

Col. 6, Line 59, change "positions" to --position--.

Signed and Sealed this

Twenty-eighth Day of January 1986

[SEAL]

Attest:

DONALD J. QUIGG

Attesting Officer     Commissioner of Patents and Trademarks